DOOR FINISHING MACHINE

Original Filed July 1, 1968 3 Sheets-Sheet 1

INVENTOR.
GEORGE L. MAYO
BY
ATTORNEY.

DOOR FINISHING MACHINE

Original Filed July 1, 1968 3 Sheets-Sheet 2

INVENTOR.
GEORGE L. MAYO

BY

ATTORNEY.

DOOR FINISHING MACHINE

Original Filed July 1, 1968 3 Sheets-Sheet 3

INVENTOR.
GEORGE L. MAYO

BY

ATTORNEY.

United States Patent Office

Re. 27,760

Reissued Sept. 18, 1973

27,760

DOOR FINISHING MACHINE

George L. Mayo, Fort Worth, Tex., by Clary Corp., San Gabriel, Calif., assignee

Original No. 3,513,889, dated May 26, 1970, Ser. No. 741,746, July 1, 1968. Application for reissue Aug. 3, 1970, Ser. No. 60,478

Int. Cl. B27m *3/00*

U.S. Cl. 144—3 R 16 Claims

Matter enclosed in heavy brackets [ ] appears in the original patent but forms no part of this reissue specification; matter printed in italics indicates the additions made by reissue.

ABSTRACT OF THE DISCLOSURE

A machine for drilling and routing a door to receive a door lock in which a rotating cutting tool having a drilling portion and a routing tip is first caused to enter the door by an amount equal to the depth of the lock face recess, whereupon the tool is moved laterally in coordinate directions to form the recess. Thereafter, the tool is centered and advanced, causing the drill portion thereof to drill the lock bolt hole. Pneumatically operable devices operate in timed sequence to clamp the door in position and to operate the cutting tool in various directions.

This invention relates to woodworking machines and has particular reference to machines for automatically routing and drilling doors for attachment of door locks thereto.

A principal object is to provide a relatively simple and high speed machine to drill and rout a door or the like to receive a door lock.

Another object is to provide a machine of the above type in which the routing of the lock face recess and the drilling of the bolt hole bore is done by the same tool.

Another object is to provide a machine of the above type in which the routing and boring tools are moved by fluid power under control of a basic timing unit.

Another object is to provide a machine of the above type in which the speed and amount of movement of the various routing and drilling tools may be readily adjusted.

The manner in which the above and other objects of the invention are accomplished will be readily understood on reference to the following specification when read in conjunction with the accompanying drawings, wherein.

Figure 1:
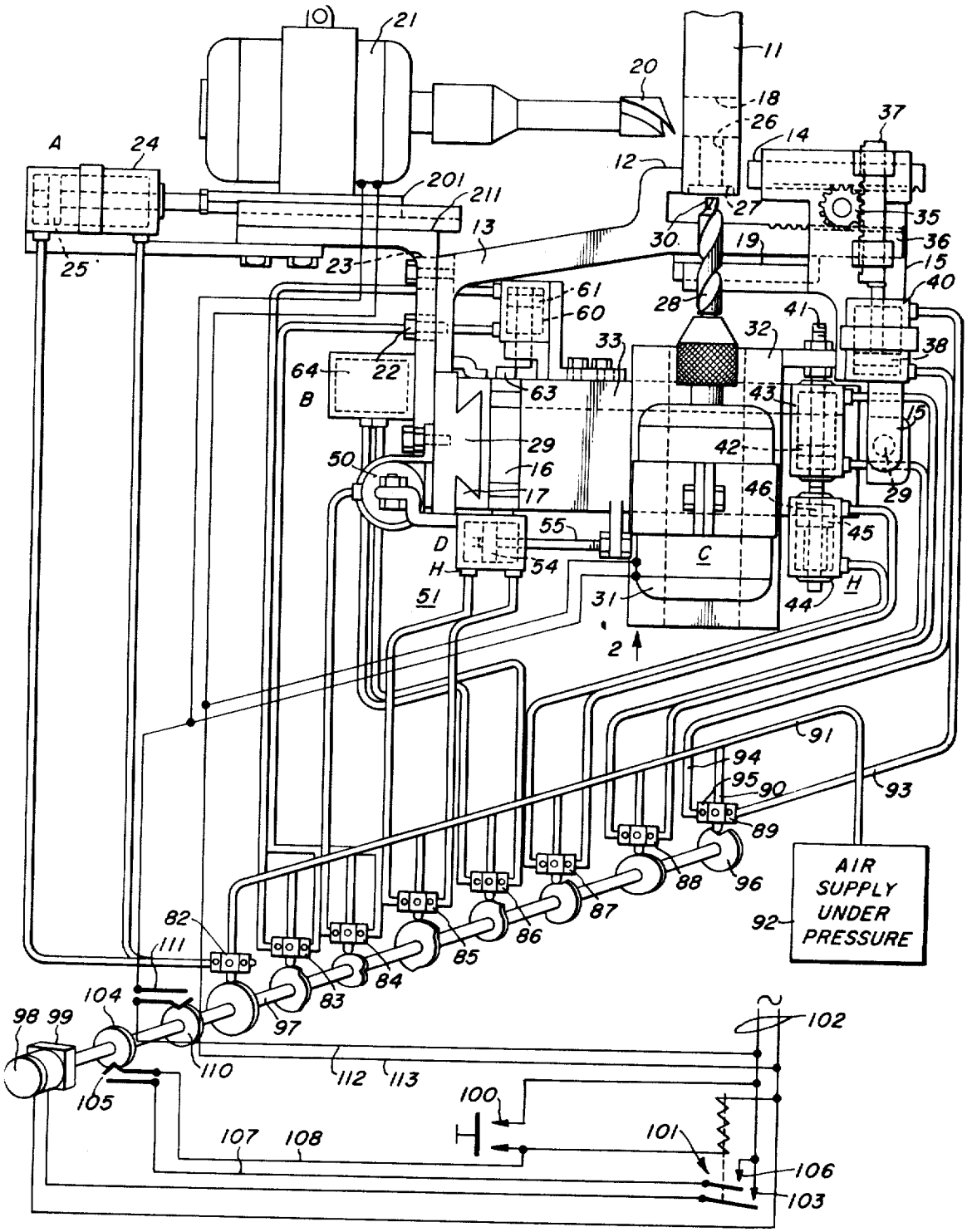
FIG. 1 is an end view of the machine embodying the present invention and showing certain of the parts in schematic form.
Figure 2:
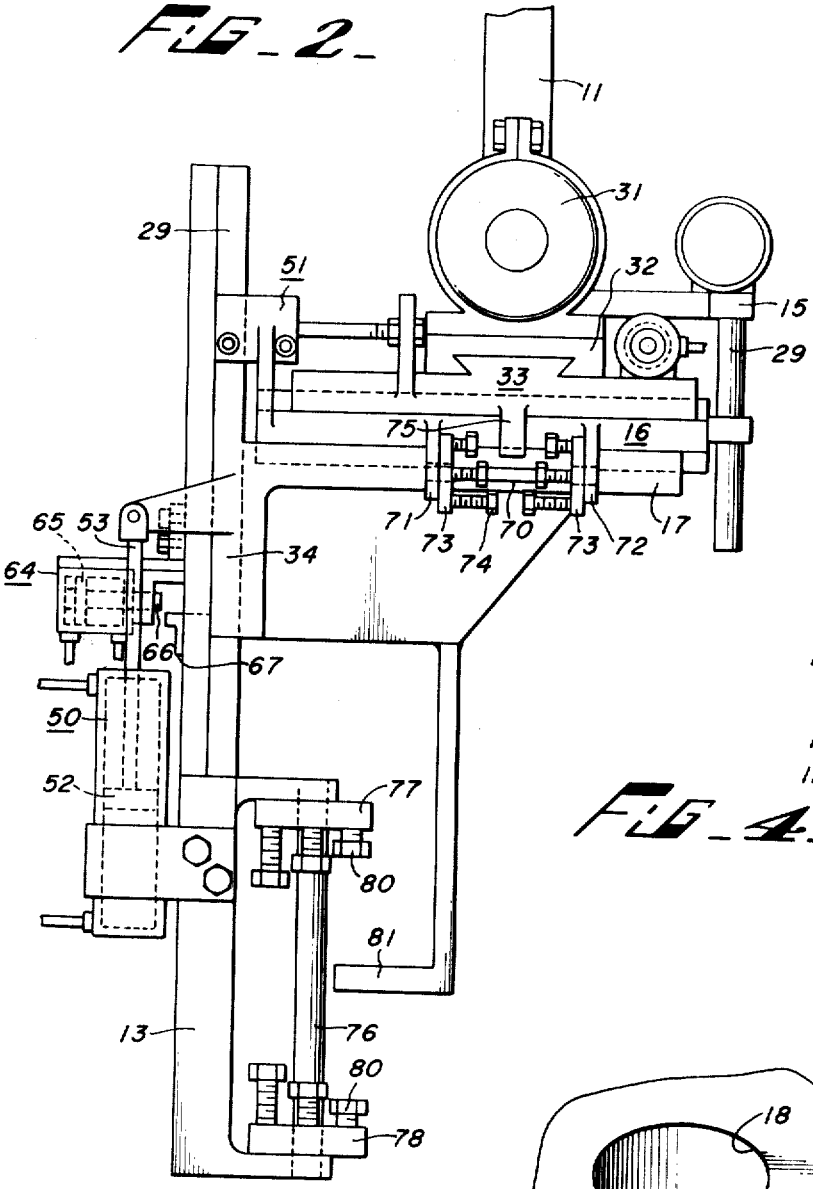
FIG. 2 is a bottom view taken in the direction of the arrow 2 of FIG. 1.

Refering to FIGS. 1 and 2, a door blank, partly shown at 11, is suitably supported on supports or guides (not shown) in a vertical position between a stationary bracket 12 forming part of a machine frame 13 and a gear rack 14 slideably supported in a bearing carried by a carriage 15 which is slidably mounted on ways 19 carried by the frame 13 for movement lengthwise of the gear rack.

Means are provided for drilling a lock handle bore 18 in the door blank. For this purpose, a drill 20 is provided. The drill is carried and driven by an electric motor 21 mounted on a slide 201 which is movable lengthwise of the bore 18 on ways formed on a bracket 211. The latter is mounted on the frame 13 for adjustment transversely of the axis of the drill 20 by bolts 22 which extend through elongated slots 23 in the bracket and are threadably attached to the frame.

Endwise movement of the drill 20 is effected by an air cylinder 24, the piston 25 of which has its piston rod connected to the slide 201.

Figure 4:
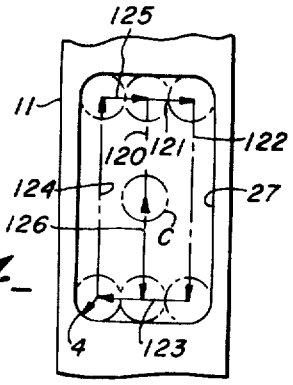
FIG. 4 is an end view of a portion of a door blank showing the lock face recess routed therein.
Figure 3:
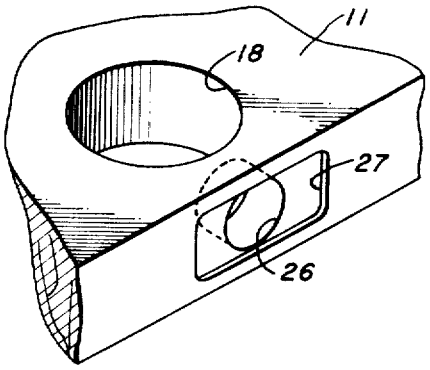
FIG. 3 is a perspective view of a portion of a door blank with a lock face recess and lock receiving holes formed therein.

Means are provided for drilling a lock bolt hole or bore 26 and for routing a lock face recess 27 (see also FIGS. 3 and 4) in the door blank. According to the present invention, a single combined router and drill or boring tool 28 is provided for this purpose. The tool 28 has a tip section 30 having a flat end face and a radius equal to the radius 4 (FIG. 4) of the lock face recess. The main drilling of boring section of the tool 28 has a diameter equal to the diameter of the hole 26.

The tool 28 is driven by a motor 31 attached to a slide 32 which is movable lengthwise of the tool 28 on ways formed on a slide 33. The latter, in turn, is movable in a direction transverse to the axis of tool 28 on ways carried by an intermediate slide 16. The slide 16 is coupled to the carriage 15 to move therewith. For this purpose, a post 29 depends from the carriage and is received in a bearing formed in the right-hand end of the slide 16. The slide 16 is slidable on ways formed on a carriage 17 which is movable at right angles to the direction of movement of the slide 33. For this purpose, the carriage is slidable on ways formed on a track section 29 of the main machine frame 13.

Means are provided to clamp the door blank 11 in place prior to a drilling and routing operation and at the same time to automatically center the tool 28 so that it will drill the hole 26 and rout the recess 27 in the exact center of the door, regardless of the thickness of the latter. For this purpose, the gear rack 14 meshes with a pinion 35 rotatably mounted on the carriage 15, which pinion, in turn, meshes on its opposite side with a gear rack section 36 integral with the frame 13. The pinion 35 also meshes with a gear rack 37 slideably mounted on the carriage 15 and attached to a piston 38 of an air cylinder 40, also supported by the carriage 15. Upon upward actuation of the piston 38, the gear rack 37 will rotate the pinion 35 counterclockwise, forcing the gear rack 14 against the side of the door blank and causing the carriage 15 and intermediate slide 16 to move to the left at the rate of one-half the travel of the gear rack, thereby centering the tool 28 relative to the door blank.

Means are provided to cause the tool 28 to first route the lock face recess 27 and to thereafter drill the hole 26. For this purpose, the slide 32 is adjustably connected to the piston rod 41 of piston 42 operable in an air cylinder 43 attached to the upper slide 33. A second air cylinder 44 is attached to the slide 33 and has a piston 45 whose piston rod 46 normally abuts the lower end of the piston rod 41.

Piston 45 has a relatively short stroke and when actuated upwardly to the limit of its travel, moves the piston rod 41 to raise the slide 32 until the tip of the tool 28 enters the door blank by an amount equal to the depth of the recess 27. Piston 42, on the other hand, has a sufficient length of travel to raise the slide 32 until the main body of the tool 28 completely drills the hole 26.

In order to move the tool 28 laterally in coordinate directions so as to rout the recess 27, the carriage 17 and the slide 33 are successively moved by air cylinders 50 and 51, respectively, under control of a timing unit, to be described later.

For the purpose of moving the carriage 17, the air cylinder 50 is attached to the frame 13 and has a piston 52 whose piston rod 53 is suitably attached to the carriage 17. Likewise, for the purpose of moving the slide 33, the cylinder 51 is suitably attached to the slide 16 and its piston 54 has its piston rod 55 suitably attached to the slide 33.

In order to accurately hold the tool 28 in a central position C (FIG. 4) relative to the recess 27, wherein it is effective to drill the hole 26, two air-actuated stop devices are provided. Referring to FIG. 1, one such stop device comprises an air cylinder 60 carried by slide 16 and having a piston 61 whose piston rod 62 forms a stop adapted to arrest a lug 63 on the slide 33 when the slide is moved rightward by its air cylinder 51. The other stop device comprises an air cylinder 64 carried by the frame 13. The cylinder 64 has a piston 65 whose piston rod 66 is adapted to arrest a lug 67 on the carriage 17 when such carriage is moved upwardly in FIG. 2 by the cylinder 50.

Means are provided for quickly and accurately presetting the machine to cut recesses 27 of different dimensions to accommodate locks having different size lock faces. Referring to FIG. 2, the means for controlling the width of a recess 27 comprises a shaft 70 rotatably mounted in bearings formed in brackets 71 and 72 extending from the intermediate slide 16. Discs 73 are attached to the shaft adjacent the brackets and carry aligned sets of adjustable stop screws 74 therearound. The stop screw assembly may be rotated to locate different pairs of stop screws in blocking relation with a lug 75 carried by the slide 33 to thereby limit the travel of the tool 28 in opposite directions by amounts depending upon the adjustment of the stop screws. Suitable detent means (not shown) are provided to yieldably locate the stop screw assembly in place.

The means for controlling the length of a recess 27 is similar to that described above and comprises a shaft 76 rotatably mounted in brackets carried by the frame 13. Discs 77 and 78 are attached to the shaft 76 adjacent the brackets and carry aligned sets of adjustable stop screws 80 adapted to block a lug 81 carried by the carriage 17 and thus limit the travel of the tool 28 in opposite directions along the length of the recess.

The various air cylinders 24, 60, 50, 51, 64, 44, 43 and 40 are controlled by a series of four-way valves 82 to 89, respectively. Such valves are of well-known construction and have one inlet, i.e. 90, connected to a common air line 91 which receives air under pressure from air supply source 92. One outlet, i.e. 93, of each valve is connected to one end of its respective air cylinder and the other outlet, i.e. 94, is connected to the opposite end of its respective cylinder.

Suitable adjustable air constrictors 95 are preferably located at the outlet sides of the various valves to regulate the rate of flow of air to the various air cylinders and thus regulate the rate of movement of the pistons in such cylinders.

Air received from the inlet 90 of each valve is normally fed to the one outlet to thereby yieldably hold the piston in the corresponding cylinder at one extreme of its travel while the other outlet is vented to the atmosphere. However, this condition may be reversed to enable air from the valve inlet to be fed to the opposite outlet under control of a cam, i.e. 96, which engages and moves a plunger on the valve to connect such opposite outlet to the inlet and to allow air from the other outlet to be vented.

The various cams are mounted on a shaft 97 on the timing unit, which shaft is operable by a motor 98 through a gear reduction unit generally indicated at 99. Upon closing of a pushbutton switch 100 the operating coil of a relay 101 is energized by connecting the same in circuit with a power circuit 102. Switch contacts 103 of the relay now close to connect the power circuit through the motor 98 and as the latter starts to rotate, a cam disc 104 on shaft 97 closes a set of contacts 105 to establish a holding circuit through holding relay contacts 106, such holding circuit extending over lines 107 and 108 and through the coil of relay 101. Also, as the shaft 97 rotates, a cam disc 110 thereon closes a set of contacts 111 to connect the power circuit through lines 112 and 113 to the motors 21 and 31, causing the same to operate throughout the complete cycle or revolution of the shaft 97. As the latter completes its cycle, the contacts 105 and 111 open to deenergize the motors 21, 31, and 98.

OPERATION

Figure 5:
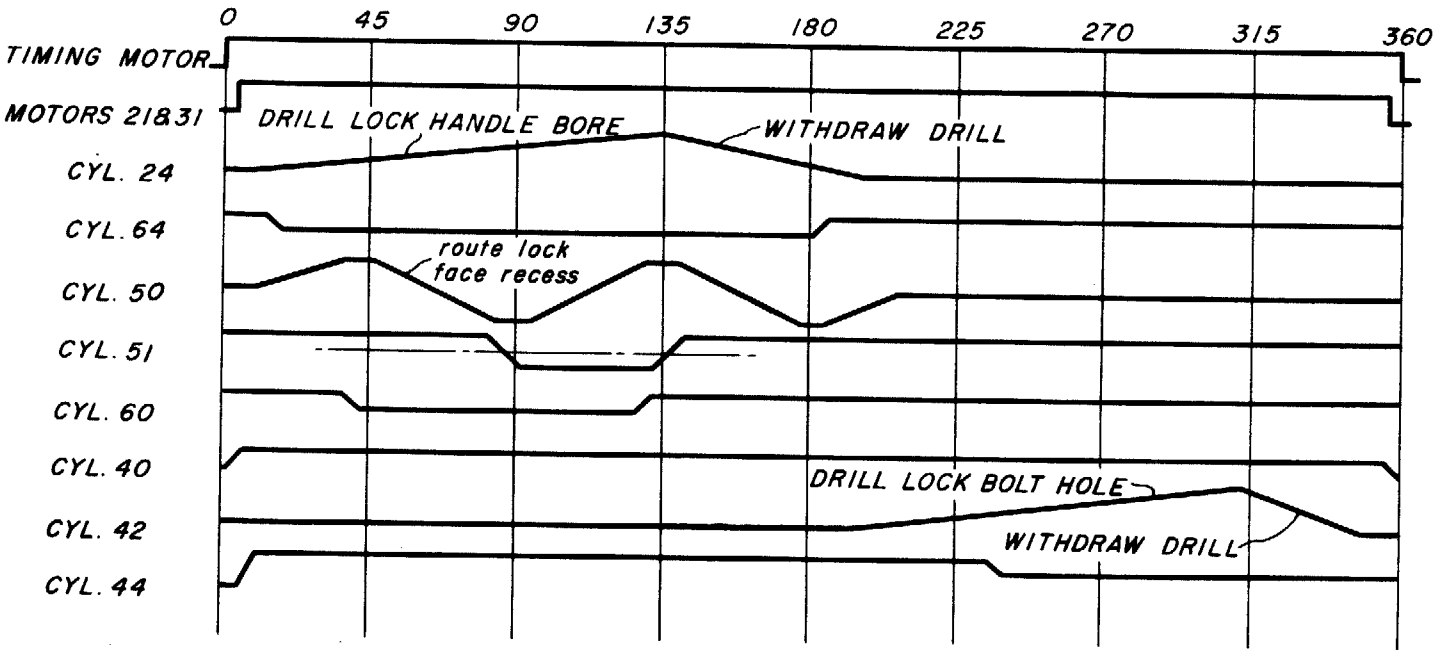
FIG. 5 is a timing chart of the machine.

Describing now the general operation of the machine, and assuming that a door blank 11 is placed in position between the locating bracket 12 and the clamping gear rack 14, the operator momentarily closes the switch 100 to initiate a cycle of the timing motor 98, causing a complete revolution of the cam shaft 97. As shown in the timing diagram of FIG. 5, motors 21 and 31 rotate throughout the cycle. Shortly after the cycle begins, the valve 89 is actuated by its cam 96 to admit air to the lower end of the clamp cylinder 40, raising its piston 38 to rotate the pinion 35 counterclockwise, forcing the gear rack 14 into clamping engagement with the side of the door blank and concurrently shifting the carriage 17 leftward to center the tool 28 relative to the door blank. During this time, the tool is centered relative to the slide 16 due to the fact that the air cylinders 60 and 64 hold their respective stops in place to arrest the lugs 63 and 67, respectively, on the slide 33 and carriage 17. It should be noted that at this time air is admitted to the lefthand end of cylinder 51 and the lower end of cylinder 50.

Valve 82 is actuated to admit air to the left-hand air of cylinder 24 to advance the drill 20 through a drilling stroke during approximately the first 135 degrees of the cycle, after which the valve condition is reversed to withdraw the drill.

At approximately 10 degrees, air is admitted to the lower end of cylinder 44 to raise the motor 31 and tool 28 to enter the router tip section 30 into the door blank to the desired depth of the lock face recess 27. Following this, air is admitted to the right-hand side of the cylinder 64 to withdraw the stop 66, permitting the piston 52 in cylinder 50 to advance the carriage 17 and thereby the tool 28 along a path 120 (FIG. 4) to one end of the recess 27 where the lug 81 engages an aligned stop screw 80. Following this, air is admitted to the lower end of the cylinder 60 to withdraw the stop 62, permitting piston 54 in cylinder 51 to move the motor 31 and tool 28 laterally along the short path 121. Thereafter, the condition of valve 84 is reversed to admit air to the upper end of cylinder 50 (FIG. 2) to traverse a path 122 along the length of the recess. Thereafter, the condition of valve 85 is reversed to cause piston 54 in cylinder 51 to cause the tool to traverse a path 123. The condition of valve 84 is now again reversed to traverse the tool along the path 124, after which valves 83 and 85 are reversed, causing the tool to traverse path 125. Now, valve 84 is again reversed to cause the tool to follow path 126 through the entire length of the recess. The valves 84 and 86 are now reversed to place the stop 66 in the path of lug 67 to return the tool to its central position C. At this time, valve 88 is reversed, admitting air to the lower end of the cylinder 43, raising the motor 31 to drill the lock bolt hole 26, after which the valve 88 is reversed to withdraw the tool and then valve 89 is reversed to withdraw the gear rack from clamping engagement with the door blank.

It will be noted that the length of any of the timing phases of the cycle may be readily changed by adjustment of appropriate ones of the air constricting means, i.e. 95, to suit the cutting speeds for different types of wood or other material or to suit different lengths of the lock bolt hole 26 or the like.

Having thus described the invention, what is desired to be secured by United States Letters Patent is:

1. In a door finishing machine,
the combination comprising,
means for supporting a door or the like,
a rotatable cutting tool having a router tip section of relatively small diameter and a drilling section of relatively large diameter, means for rotating said tool, means for advancing said tool endwise through a first increment of travel into said door to a predetermined level wherein only said router section is in cutting relation to said door, means for moving said tool laterally while at said predetermined level whereby to form a recess, and means for thereafter further advancing said tool endwise through a second increment of travel into said door to cause said drilling section to drill a lock bolt hole.

2. The combination according to claim 1 wherein said moving means comprises means for moving said tool in coordinate lateral directions while at said predetermined level, and means for thereafter locating said tool in a predetermined lateral position during said further advancement of said tool.

3. The combination according to claim 1 wherein said moving means comprises means for moving said tool in coordinate lateral directions while at said predetermined level, and means for thereafter centering said tool relative to said recess prior to and during said further advancement of said tool.

4. The combination according to claim 1 wherein said moving means comprises a fluid operated device for moving said tool laterally in one direction and a second fluid operated device for moving said tool laterally in a coordinate direction, and means for applying fluid to said devices in a predetermined manner.

5. The combination according to claim 4 wherein said last mentioned means yieldably applies fluid to said devices, and means for selectively limiting the length of travel of said tool in said mentioned directions.

6. The combination according to claim 4 wherein said last mentioned means yieldably applies fluid to said devices, means for selectively arresting said tool intermediate the limits of movement thereof in said directions, and means for causing said last mentioned means to arrest said tool prior to and during said further advancement of said tool.

7. The combination according to claim 1 wherein said advancing means comprises a fluid operated device having an actuating member connected to said tool and movable through a relatively long stroke whereby to advance said tool through said second increment of travel, and a second fluid operated device having a second actuating member operable against said first mentioned actuating member and movable through a relatively short stroke whereby to cause said first mentioned actuating member to advance said tool through said first increment of travel.

8. The combination according to claim 1 wherein said moving means comprises a fluid operated device for moving said tool laterally in one direction, and a second fluid operated device for moving said tool laterally in a coordinate direction; and wherein said advancing means comprises a third fluid operated device having an actuating member connected to said tool and movable through a relatively long stroke whereby to advance said tool through said second increment of travel, and a fourth fluid operated device having a second actuating member operable against said first mentioned actuating member and movable through a relatively short stroke whereby to cause said first mentioned actuating member to advance said tool through said first increment of travel; and means for applying fluid to said devices in a predetermined manner.

9. The combination according to claim 1 wherein said moving means comprises a first fluid operated device for moving said tool laterally in one direction, and a second fluid operated device for moving said tool laterally in a coordinate direction; and wherein said advancing means comprises a third fluid operated device for moving said tool through said first increment of travel, and a fourth fluid operated device for moving said tool through said second increment of travel; and means for applying fluid to said devices in a predetermined manner.

10. The combination according to claim 4 comprising a third fluid operated device for arresting said tool intermediate the limits of movement thereof in one of said directions, said last mentioned means being effective to apply fluid to said third device.

11. The combination according to claim 4 comprising a third fluid operated device for arresting said tool intermediate the limits of movement thereof in said one direction, a fourth fluid operated device for arresting said tool intermediate the limits of movement thereof in said coordinate direction, said last mentioned means being effective to apply said fluid to said third and fourth devices.

12. In a door finishing machine, the combination comprising means for supporting a door or the like at an operating station, clamp means for clamping said door, said clamp means comprising a stationary clamp element and a movable clamp element engageable with opposite side surfaces of said door, a stationary gear rack extending in the direction of movement of said movable clamp element, a second gear rack on said movable clamp element extending in the direction of movement of said movable clamp element, a carriage movable in the direction of movement of said movable clamp element, a pinion on said carriage and meshing on one side with said first mentioned gear rack and meshing on the opposite side with said second gear rack, a rotary cutting tool operatively connected to said carriage for cutting into one edge of said door, and means for rotating said pinion whereby to cause said movable clamp element to clamp against said door and for causing said carriage to center said tool relative to the side surfaces of said door.

13. The combination according to claim 12 comprising fluid operated means for moving said tool laterally in the direction of movement of said carriage, and adjustable stop means operatively connected to said carriage for limiting said movement of said tool.

14. The combination according to claim 12 comprising a second carriage movable along the length of said door, a first slide member operatively connected to said first carriage and movable along said second carriage in the direction of movement of said first carriage, a second slide member movable along said first slide member in the direction of movement of said first slide member, means on said second slide member supporting said cutting tool, a fluid operated device for moving said second carriage, a fluid operated device for moving said first slide, a fluid operated device for moving said second slide, and means for applying fluid to said devices in a predetermined manner.

15. The combination according to claim 14 wherein said tool supporting means comprises a third slide member movable along said second slide member and toward and away from said door, and a fluid operated device for moving said third slide member, said fluid applying means being effective to apply fluid to said last mentioned device.

*16. In a door finishing machine,*

*the combination comprising,*

*means for supporting a door or the like,*

*a rotatable cutting tool having a router tip section of relatively small diameter and a drilling section of relatively large diameter,*

*means for rotating said tool,*

*first advancing means for advancing said tool endwise into said door to a predetermined level wherein only said router section is in cutting relation to said door,*

*means for moving said router laterally while at said*

*predetermined level whereby to form a recess,*

*second advancing means for advancing said tool endwise into said door beyond said predetermined level to cause said drilling section to drill a lock bolt hole,*

*and means for controlling said first and second advancing means in a predetermined sequence.*

References Cited

The following references, cited by the Examiner, are of record in the patented file of this patent or the original patent.

UNITED STATES PATENTS 3,339,601 9/1967 Christman et al. ----- 144—2 R

GERALD A. DOST, Primary Examiner

U.S. Cl. X.R.

144—82